United States Patent
Noguchi et al.

(10) Patent No.: US 11,745,800 B2
(45) Date of Patent: Sep. 5, 2023

(54) SUBFRAME STRUCTURE

(71) Applicant: HONDA MOTOR CO., LTD., Tokyo (JP)

(72) Inventors: Satoru Noguchi, Wako (JP); Ukyo Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 235 days.

(21) Appl. No.: 17/279,242

(22) PCT Filed: Sep. 27, 2018

(86) PCT No.: PCT/JP2018/036154
§ 371 (c)(1),
(2) Date: Mar. 24, 2021

(87) PCT Pub. No.: WO2020/065899
PCT Pub. Date: Apr. 2, 2020

(65) Prior Publication Data
US 2022/0048571 A1 Feb. 17, 2022

(51) Int. Cl.
*B62D 21/15* (2006.01)
*B62D 25/20* (2006.01)
(Continued)

(52) U.S. Cl.
CPC ......... *B62D 21/155* (2013.01); *B62D 25/025* (2013.01); *B62D 25/08* (2013.01);
(Continued)

(58) Field of Classification Search
CPC .... B62D 21/155; B62D 25/025; B62D 25/08; B62D 25/2027; B62D 25/2036; B62D 27/02; B62D 21/11
(Continued)

(56) References Cited

U.S. PATENT DOCUMENTS

| 7,883,113 B2 * | 2/2011 | Yatsuda | B62D 25/082 |
| | | | 180/311 |
| 10,717,469 B2 * | 7/2020 | Matsuoka | B62D 25/20 |
| (Continued) | | | |

FOREIGN PATENT DOCUMENTS

| CN | 105050888 A | 11/2015 |
| CN | 105799783 A | 7/2016 |
| (Continued) | | |

OTHER PUBLICATIONS

Chinese Office Action received in corresponding CN application No. 201880097937.1 dated Jul. 6, 2022 with English translation (15 pages).

(Continued)

*Primary Examiner* — Joseph D. Pape
*Assistant Examiner* — Dana D Ivey
(74) *Attorney, Agent, or Firm* — Rankin, Hill & Clark LLP (57) ABSTRACT

A subframe structure includes: right and left vehicle body side frames; a vehicle body cross-member extending in the vehicle width direction between the vehicle body side frames; a load transmission member connecting a portion of each vehicle body side frame that extends longitudinally frontward from a bent portion of the vehicle body side frame and a portion that is located laterally centrally relative to the laterally outer end portions of the vehicle body cross-member; right and left longitudinal members extending along the vehicle body side frames; and a front cross-member extending in the vehicle width direction between the longitudinal members. The front cross-member has a first attachment portion attached to each longitudinal member, an extension portion extending in the vehicle width direction from the first attachment portion, and a second attachment portion attached to the load transmission member at a laterally outer end portion of the extension portion.

4 Claims, 5 Drawing Sheets

(51) Int. Cl.
    *B62D 25/08*    (2006.01)
    *B62D 25/02*    (2006.01)
    *B62D 27/02*    (2006.01)
    *B62D 21/11*    (2006.01)
(52) U.S. Cl.
    CPC ..... *B62D 25/2027* (2013.01); *B62D 25/2036* (2013.01); *B62D 21/11* (2013.01); *B62D 27/02* (2013.01)
(58) Field of Classification Search
    USPC .................................................. 296/187.11
    See application file for complete search history.

(56) References Cited

U.S. PATENT DOCUMENTS

| | | |
|---|---|---|
| 2015/0360632 A1 | 12/2015 | Nishida et al. |
| 2016/0207575 A1 | 7/2016 | Tanaka et al. |
| 2018/0105210 A1 | 4/2018 | Kato et al. |

FOREIGN PATENT DOCUMENTS

| | | |
|---|---|---|
| JP | S62-192979 U | 12/1987 |
| JP | S64-8475 U | 1/1989 |
| JP | H04-39968 U | 4/1992 |
| JP | H10-297541 A | 11/1998 |
| JP | 2009-096379 A | 5/2009 |
| JP | 2010-247622 A | 11/2010 |
| JP | 5499726 B2 | 5/2014 |
| WO | 2015037130 A1 | 3/2015 |

OTHER PUBLICATIONS

International Search Report by ISA/JP dated on Oct. 30, 2018, on PCT/JP2018/036154, 2 pages.
Written Opinion by ISA/JP dated on Oct. 30, 2018, on PCT/JP2018/036154, 3 pages.

* cited by examiner

SUBFRAME STRUCTURE

TECHNICAL FIELD

The present invention relates to a subframe structure mounted on a vehicle such as an automobile.

BACKGROUND ART

For example, Patent Literature 1 discloses a vehicle body rear structure in which a rear subframe (perimeter frame) for distributing and absorbing a collision load generated in a rear-end collision is provided between a pair of right and left rear side-frames along a vehicle width direction.

The rear subframe (perimeter frame) disclosed in Patent Literature 1 includes a pair of side frames having right and left vehicular longitudinal front end portions and right and left vehicular longitudinal rear end portions respectively joined to the rear side-frames, and a front frame and a rear frame joined between the pair of side-frames.

CITATION LIST

Patent Literature

Patent Literature 1: Japanese Patent No. 5499726

SUMMARY OF THE INVENTION

Technical Problem

According to the vehicle body rear structure disclosed in Patent Literature 1, the rear subframe is attached to the vehicle body at four points (four mounting points) in total including its front and rear (in the longitudinal direction of the vehicle) and right and left.

This kind of rear subframe with a four-point support structure may not provide sufficient rigidity and strength, for example, if the weight of parts mounted on the rear subframe is increased, and thus disadvantageously lead to degradation in ride comfort and steering stability.

In view of the above, an object of the present invention is to provide a subframe structure capable of improving the rigidity and strength of the rear side of the vehicle body while suppressing an increase in the overall weight of the vehicle and manufacturing cost.

Solution to Problem

To solve the above problem, there is provided a subframe structure comprising: a pair of right and left vehicle body side frames disposed at side portions of a vehicle body, each vehicle body side frame extending in a longitudinal direction of a vehicle and bent toward outside in a vehicle width direction at a bent portion that is provided in a middle of the vehicle body side frame; a vehicle body cross-member extending in the vehicle width direction between the pair of right and left vehicle body side frames and having laterally outer end portions attached to the vehicle body side frames at positions longitudinally frontward of the bent portions; a load transmission member configured to connect a portion of each vehicle body side frame that extends longitudinally frontward from the bent portion and a portion that is located laterally centrally relative to the laterally outer end portions of the vehicle body cross-member; a pair of right and left longitudinal members extending along the pair of right and left vehicle body side frames at positions centrally spaced apart in the vehicle width direction for a predetermined distance from the vehicle body side frames; and a subframe cross-member extending in the vehicle width direction between the pair of right and left longitudinal members, wherein the subframe cross-member has a first attachment portion, an extension portion, and a second attachment portion, the first attachment portion being attached to each longitudinal member, the extension portion extending in the vehicle width direction from the first attachment portion, and the second attachment portion being attached to the load transmission member at a laterally outer end portion of the extension portion.

Advantageous Effects of the Invention

According to the present invention, there is provided a subframe structure, which can improve the rigidity and strength of the rear side of the vehicle body while suppressing an increase in the overall weight of the vehicle and manufacturing cost.

DESCRIPTION OF EMBODIMENTS

Next, one embodiment of the present invention is described in detail with reference to the accompanying drawing where appropriate.

Figure 1:
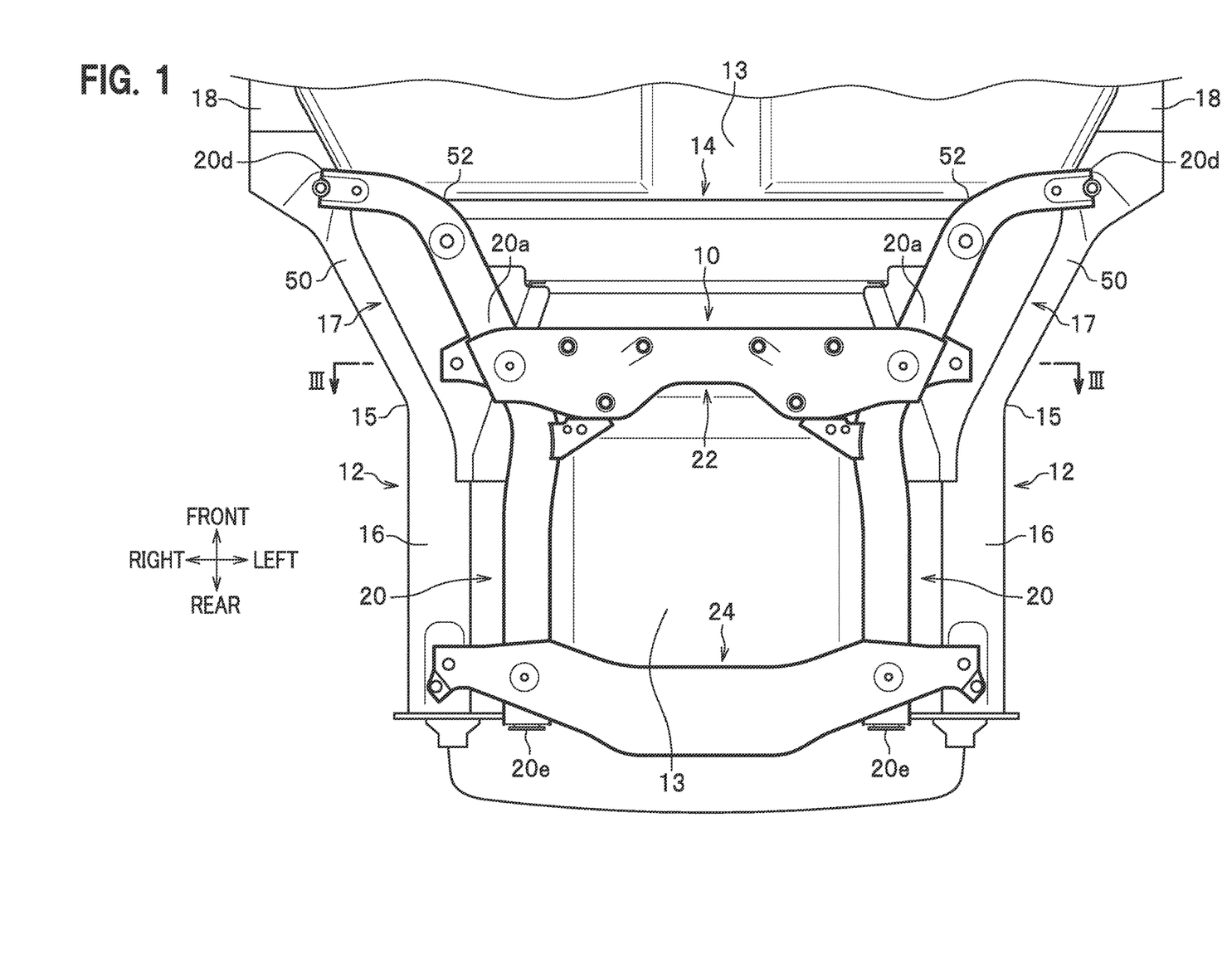
FIG. 1 is a bottom view, as viewed from a bottom side, of a rear side of a vehicle body, in which a rear subframe according to one embodiment of the present invention is assembled.
Figure 2:
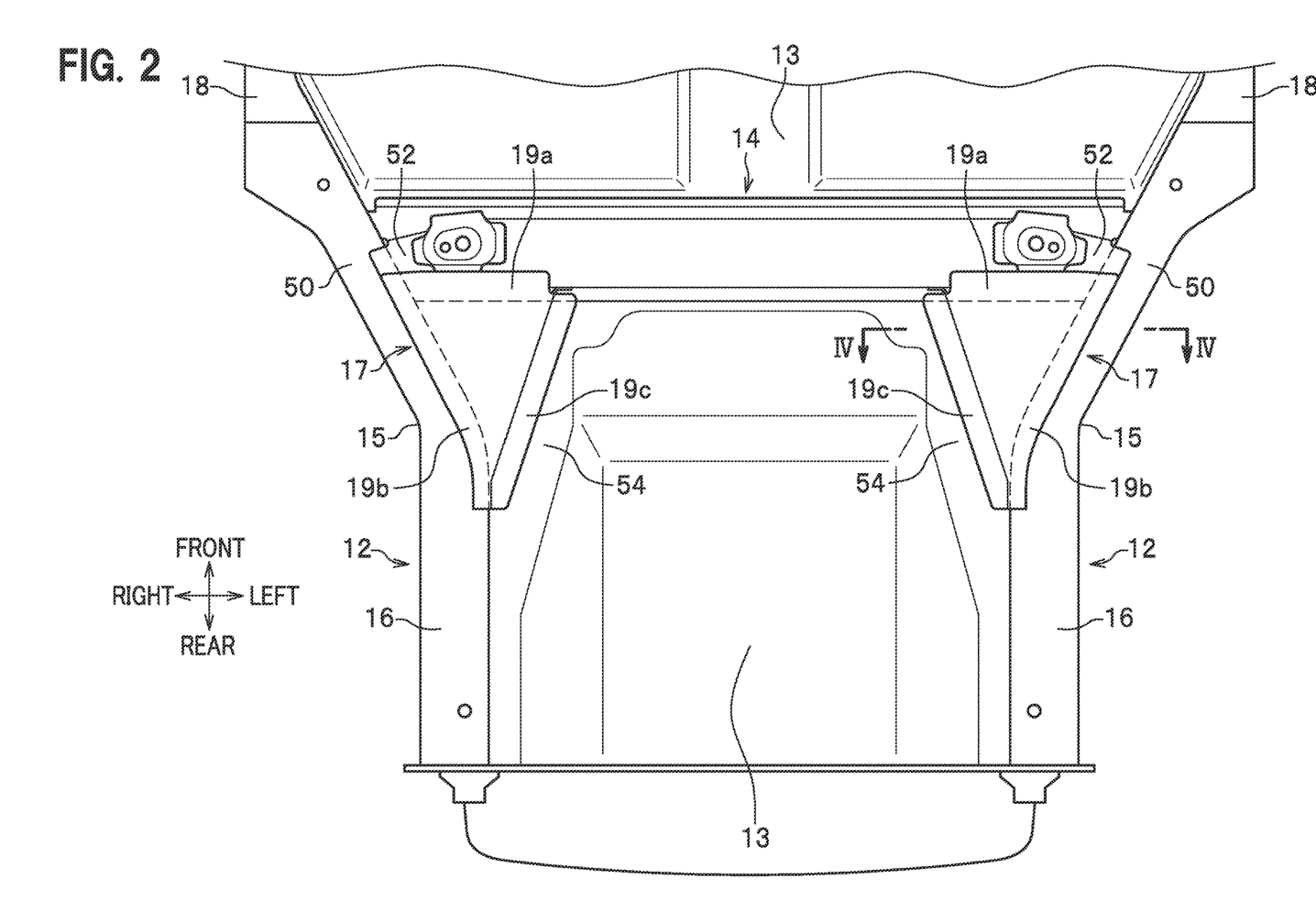
FIG. 2 is a bottom view with the rear subframe shown in FIG. 1 removed.

FIG. 1 is a bottom view, as viewed from a bottom side, of a rear side of a vehicle body, in which a rear subframe according to one embodiment of the present invention is assembled, and FIG. 2 is a bottom view with the rear subframe shown in FIG. 1 removed. In the drawings, front and rear directions refer to corresponding directions in the longitudinal direction (i.e., front-rear direction) of a vehicle, right and left directions refer to corresponding directions in the vehicle width direction (i.e., lateral direction or right-left direction) of the vehicle, and upper and lower directions refer to corresponding directions in the vertical direction (i.e., upper-lower direction) of the vehicle.

As seen in FIG. 1, a rear subframe (subframe) 10 according to one embodiment of the present invention, a pair of right and left vehicle body side frames 12, 12, and a vehicle body cross-member 14 are disposed in a rear side of a vehicle body. A rear floor panel 13 having a generally flat shape is mounted between the pair of right and left vehicle body side frames 12, 12 in the vehicle width direction.

The pair of right and left vehicle body side frames 12, 12 are disposed at side portions of the vehicle body and extend in the longitudinal direction (front-rear direction) of the vehicle. Each vehicle body side frame 12 extends in the longitudinal direction of the vehicle and is bent at a bent portion 15 that is provided in a middle of the vehicle body side frame 12. The bent portion 15 is directed toward an obliquely frontward direction of the vehicle and bent toward outside in the vehicle width direction. The vehicle body side frames 12, 12 include a pair of right and left rear side frames 16, 16, and a pair of right and left side sills 18, 18. These rear side frames 16, 16 and side sills 18, 18 are connected in the longitudinal direction of the vehicle at the right and left side portions of the vehicle body.

The vehicle body cross-member 14 extends in the vehicle width direction between the pair of right and left vehicle body side frames 12, 12. The vehicle body cross-member 14 has right and left outer end portions in the vehicle width direction; the right and left outer end portions are attached to portions of the vehicle body side frames 12 that are located longitudinally frontward of the bent portions 15, 15. Further, a portion of the vehicle body cross-member 14 that is located laterally centrally in the vehicle width direction relative to the right and left outer end portions is attached to longitudinal members 20, 20.

As seen in FIG. 2, load transmission members 17, 17 are disposed at a rear part of the vehicle where longitudinally front middle portions 50 of the vehicle body side frames 12, 12 and laterally outer portions 52, 52 of the vehicle body cross-member 14 intersect each other. The load transmission members 17 are symmetrically arranged on both right and left sides in the vehicle width direction. When viewing from the bottom, the load transmission member 17 has a generally triangular shape, and first, second, and third flange portions 19a, 19b, 19c are provided along the three sides thereof. Further, when viewing from the bottom, the load transmission member 17 has a widest dimension in the vehicle width direction at its longitudinally front side, and is gradually narrower toward its longitudinally rear side.

When viewing from the bottom, the first flange portion 19a located on the longitudinally front side is joined to the laterally outer portion 52 of the vehicle body cross-member 14. The second flange portion 19b located on the laterally outer side in the vehicle width direction is joined to the longitudinally front middle portion 50 of the vehicle body side frame 12.

Figure 3:
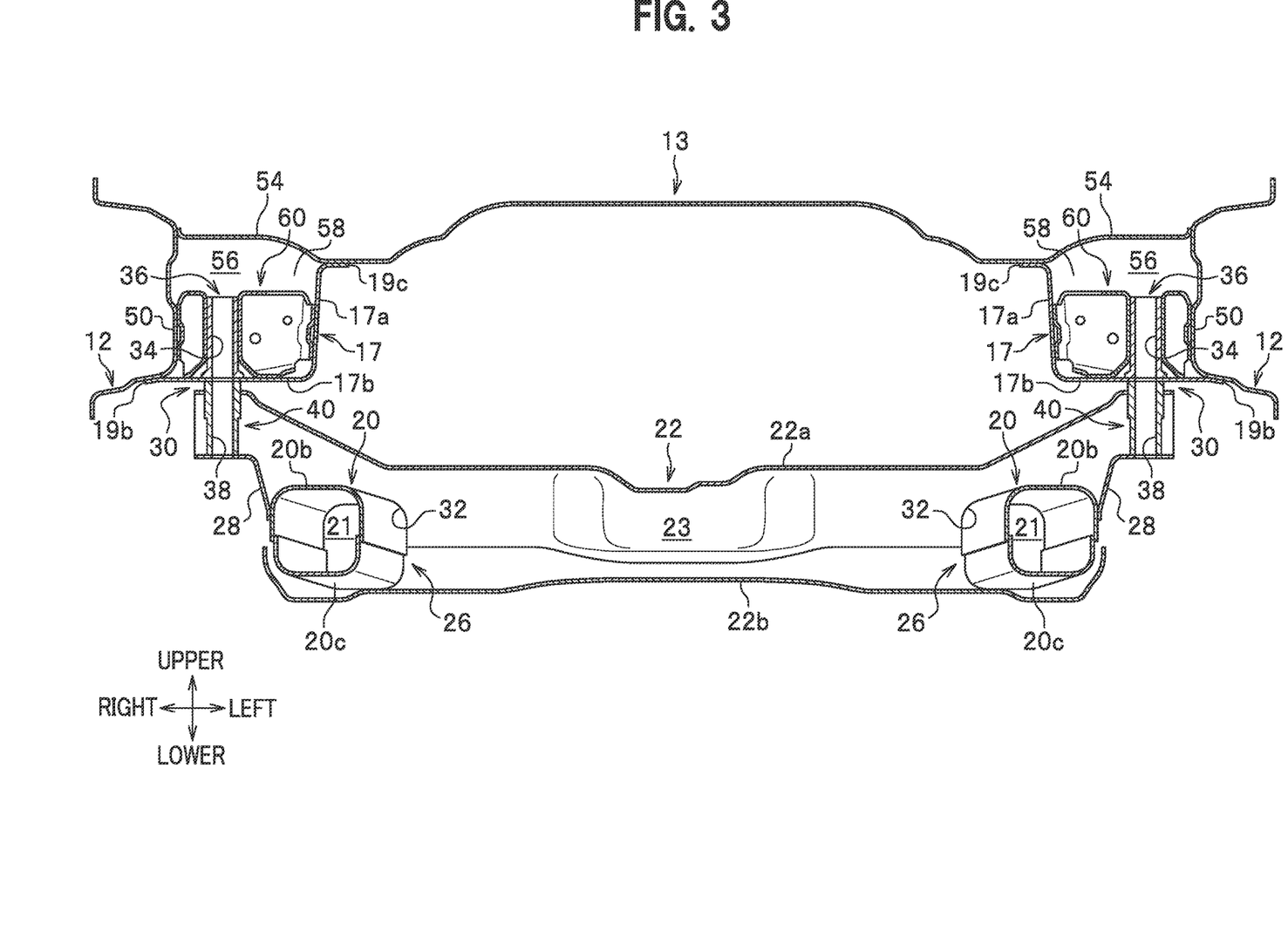
FIG. 3 is a vertical sectional view taken along the line III-III of FIG. 1.
Figure 4:
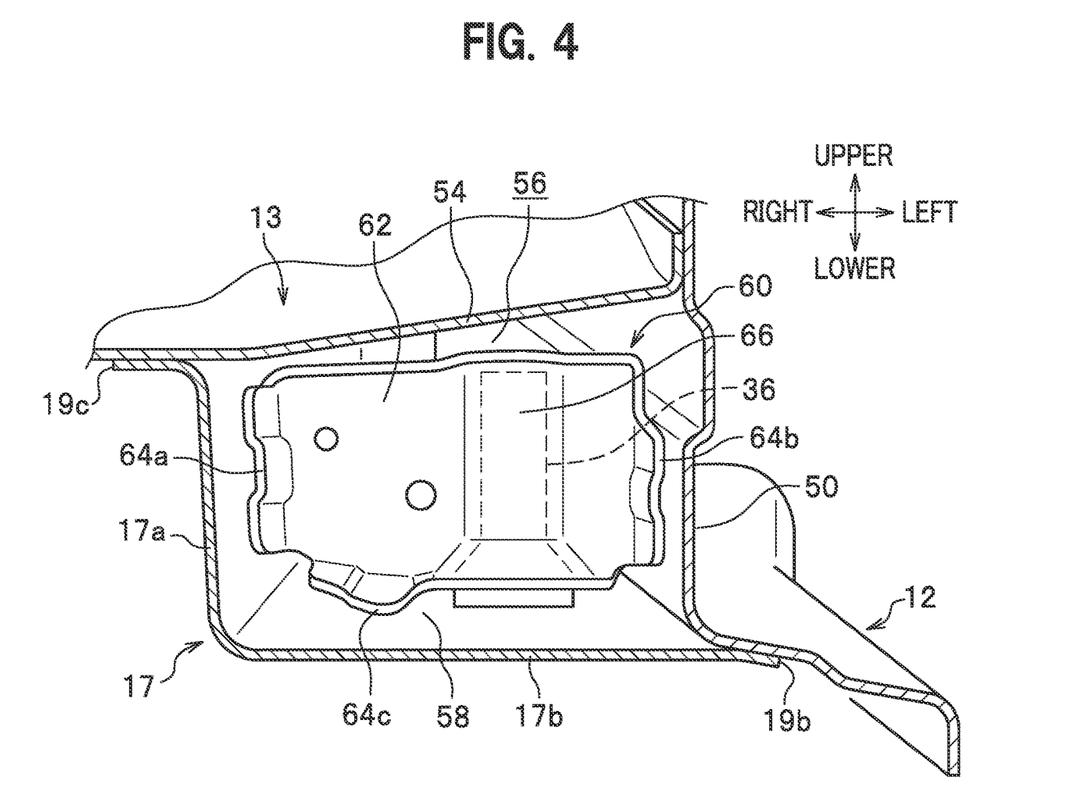
FIG. 4 is a vertical sectional view taken along the line IV-IV of FIG. 2.

FIG. 3 is a vertical sectional view taken along the line of FIG. 1, and FIG. 4 is a vertical sectional view taken along the line IV-IV of FIG. 2. It should be noted that FIG. 3 shows the depth dimension of the longitudinal member 20.

As seen in FIG. 3, the third flange portion 19c located on the laterally inner side is joined to a laterally outer portion 54 of the rear floor panel 13. Accordingly, the load transmission member 17 connects a portion of each vehicle body side frame 12 (longitudinally front middle portion 50) that extends longitudinally frontward from the bent portion 15 and a portion (laterally outer portion 54) that is located laterally centrally relative to the laterally outer end portions of the vehicle body cross-member 14.

Further, the load transmission member 17 has a generally L-shaped cross-section along the vehicle width direction (see FIGS. 3 and 4) such that a vertical wall portion 17a and a horizontal wall portion 17b that intersect at right angles are formed continuously. As seen in FIG. 4, the vertical wall portion 17a is joined to the laterally outer portion 54 of the rear floor panel 13 through the third flange portion 19c. The horizontal wall portion 17b is joined to an inwardly recessed side wall (longitudinally front middle portion 50) of the vehicle body side frame 12 through the second flange portion 19b. The load transmission member 17 having a generally L-shaped cross-section (vertical wall portion 17a and horizontal wall portion 17b), the longitudinally front middle portion 50 of each vehicle body side frame 12, and the laterally outer portion 54 of the rear floor panel 13 constitute a closed section portion 58 having a hollow closed section 56.

Returning to FIG. 1, the rear subframe 10 is located laterally inward of the pair of right and left vehicle body side frames 12, 12 and mounted on the lower side of the pair of right and left vehicle body side frames 12, 12. Further, the rear subframe 10 is configured to support rear suspension systems (not shown) and also to support a power unit (not shown) such as a drive source (e.g., motor and engine) through a vibration isolator (not shown).

As seen in FIG. 1, the rear subframe 10 includes the pair of right and left longitudinal members 20, 20 extending in the longitudinal direction (front-rear direction) of the vehicle, and a cross-member extending in the vehicle width direction between the pair of right and left longitudinal members 20, 20. The cross-member includes a front cross-member 22 (subframe cross-member) fixed to the longitudinally front side of the pair of right and left longitudinal members 20, 20, and a rear cross-member 24 fixed to the longitudinally rear side of the pair of right and left longitudinal members 20, 20.

As seen in FIG. 3, the front cross-member 22 has a first attachment portion 26, an extension portion 28, and a second attachment portion 30 on each side thereof.

The first attachment portions 26, 26 are configured such that portions of the front cross-member 22 that are located laterally sideward from a central portion toward right and left ends thereof are attached to the longitudinal members 20, 20. When viewing from a side (that is, from the longitudinal direction of the vehicle), the front cross-member 22 has a through opening 32 on each side thereof. The through opening 32 has a generally square or rectangular shape. The through opening 32 is formed to extend in the longitudinal direction of the vehicle through a front wall of the front cross-member 22 that faces frontward in the longitudinal direction of the vehicle and a rear wall of the front cross-member 22 that faces rearward in the longitudinal direction of the vehicle.

A longitudinally front portion 20a of each longitudinal member 20 is inserted into the through opening 32 and thus attached to the front cross-member 22. In other words, the longitudinally front portion 20a of each longitudinal member 20 is fitted into the through opening 32 of the front cross-member 22. The shape of the through opening 32 of the front cross-member 22 corresponds to the sectional shape of the longitudinally front portion 20a perpendicular to the axis of each longitudinal member 20.

The extension portion 28 extends from the first attachment portion 26 so as to rise in a laterally outward and upward direction.

The second attachment portion 30 is attached to the load transmission member 17 at a laterally outer end portion of the extension portion 28. To be more specific, a cylindrical first collar member (collar member) 36 having a first through opening 34 is fixed in a closed section 56 that is formed by the load transmission member 17 and other members. The first collar member 36 vertically (i.e., in the upper-lower direction) connects the interior of the closed section 56 of the load transmission member 17. The first collar member 36 is attached to a partition wall member 60 to be described later. Further, a cylindrical second collar member 40 having a second through opening 38 is fixed in a closed section 23 of the front cross-member 22. The second collar member 40 vertically (i.e., in the upper-lower direction) connects the interior of the closed section 23 of the front cross-member 22.

The first collar member 36 and the second collar member 40 are arranged such that they are coaxially and vertically superposed one on top of another in the upper-lower direction. The front cross-member 22 is fixed to the load transmission member 17 by inserting a bolt (not shown) through the first through opening 34 of the first collar member 36 and the second through opening 38 of the second collar member 40 and tightening the bolt with a nut (not shown).

Further, the front cross-member 22 includes an upper cross-member portion 22a located on the upper side and a lower cross-member portion 22b located on the lower side. The closed section 23 is formed inside the upper cross-member portion 22a and the lower cross-member portion 22b (see FIG. 3).

The rear cross-member 24 includes an upper wall whose section perpendicular to the axis thereof is generally U-shape, and a lower wall whose section perpendicular to the axis thereof is generally U-shape, so that a closed section portion (not shown) having a closed section is formed by the upper wall and the lower wall.

The pair of right and left longitudinal members 20, 20 are similar in construction and arranged in a laterally symmetrical manner. Each of the longitudinal members 20, 20 includes an upper wall portion 20b having a U-shaped section, and a lower wall portion 20c having a U-shaped section. The upper wall portion 20b and the lower wall portion 20c are integrally connected (joined) through flange portions to form a closed section 21 inside the longitudinal member 20 (see FIG. 3). Further, longitudinally front end portions 20d of the longitudinal members 20, 20 are located further outside in the vehicle width direction than longitudinally rear end portions 20e of the longitudinal members 20, 20, so that the longitudinal members 20, 20 are arranged in a forwardly divergent configuration.

As seen in FIG. 1, the pair of right and left longitudinal members 20, 20 extend along the pair of right and left vehicle body side frames 12, 12 at positions centrally spaced apart in the vehicle width direction for a predetermined distance from the vehicle body side frames 12, 12.

Figure 5:
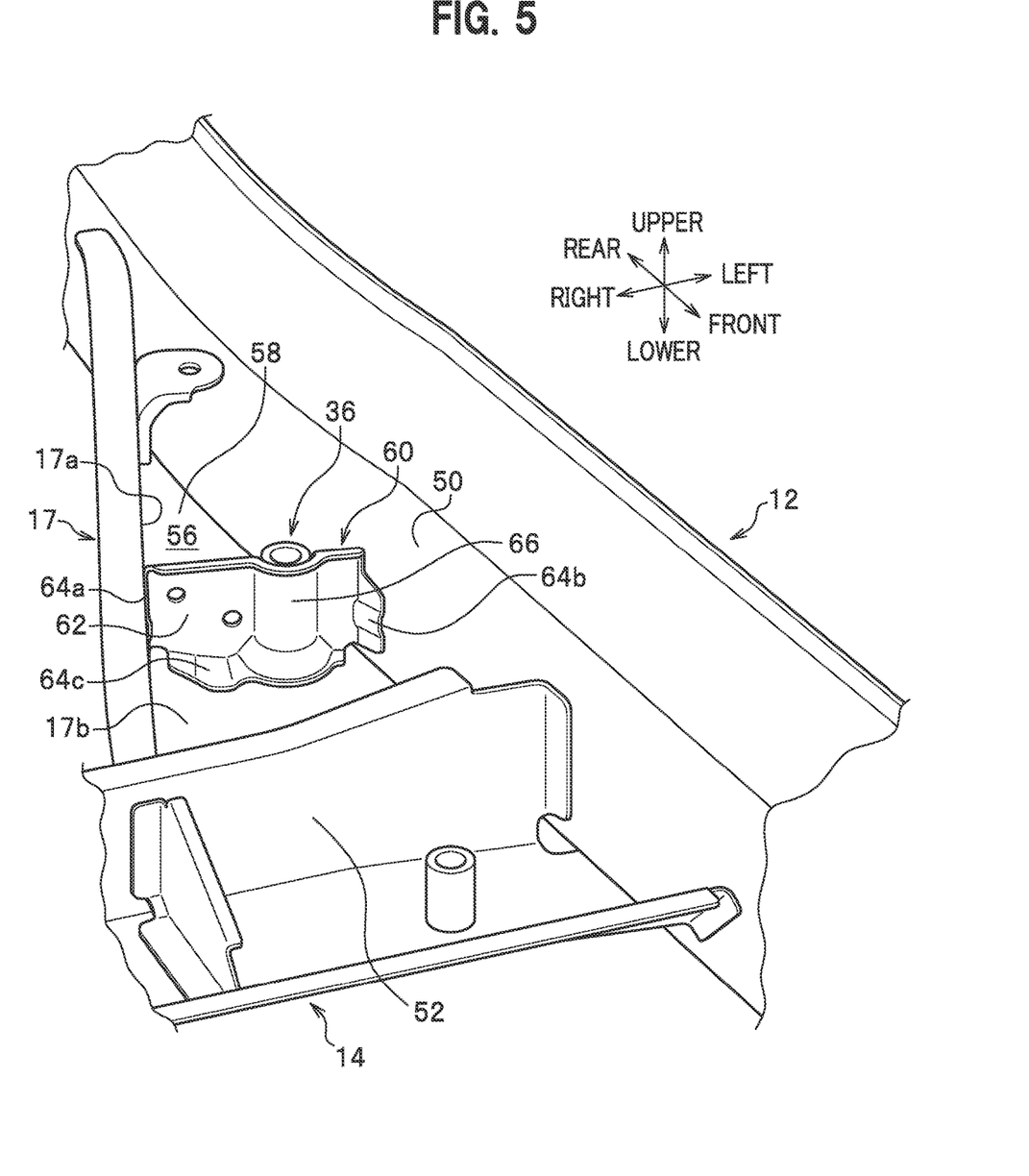
FIG. 5 is an enlarged perspective view of a partition wall member disposed in a closed section portion of a load transmission member.

FIG. 5 is an enlarged perspective view of the partition wall member disposed in the closed section portion of the load transmission member.

As seen in FIGS. 4 and 5, the partition wall member 60 extending in the vehicle width direction is disposed in the closed section 56 of the load transmission member 17. The partition wall member 60 is disposed between the longitudinally front middle portion 50 of each vehicle body side frame 12 and the vertical wall portion 17a of the load transmission member 17.

The partition wall member 60 includes a partition wall body portion 62 having a flat plate-shape along the vehicle width direction, a first joint flange portion 64a and a second joint flange portion 64b provided on both laterally end portions of the partition wall body portion 62, a third joint flange portion 64c provided on a bottom portion of the partition wall body portion 62, and a curved portion 66 provided at a laterally middle portion of the partition wall body portion 62. The curved portion 66 has a generally circular arc profile and extends in the vertical direction (upper-lower direction).

The first joint flange portion 64a that is located inward in the vehicle width direction is joined to the vertical wall portion 17a of the load transmission member 17. The second joint flange portion 64b that is located outward in the vehicle width direction is joined to the longitudinally front middle portion 50 of the vehicle body side frame 12. The third joint flange portion 64c that is located on the bottom portion of the partition wall body portion 62 is joined to the horizontal wall portion 17b of the load transmission member 17.

Further, a first collar member 36 vertically connecting the interior of the closed section 56 is disposed in the closed section portion 58. The first collar member 36 is joined to the curved portion 66 of the partition wall member 60. The second attachment portion 30 of the front cross-member 22 is attached to the partition wall member 60 and/or the first collar member 36.

The rear subframe 10 according to this embodiment is basically configured as described above, and operational effects thereof are described below.

According to this embodiment, the load transmission member 17 is provided for connecting a portion of each vehicle body side frame 12 (longitudinally front middle portion 50) that extends longitudinally frontward from the bent portion 15 and a portion (laterally outer portion 52) that is located laterally centrally relative to the laterally outer end portions of the vehicle body cross-member 14. Further, according to this embodiment, the front cross-member 22 includes the first attachment portion 26, the extension portion 28, and the second attachment portion 30.

According to this embodiment, the front cross-member 22 is attached to the longitudinal member 20 and to the vehicle body side frame 12 through the load transmission member 17, so that the rigidity for supporting the rear subframe 10 with respect to the vehicle body can be improved. As a result, according to this embodiment, it is possible to improve the rigidity and strength of the rear side of the vehicle body while suppressing an increase in the overall weight of the vehicle and manufacturing cost.

Further, the front cross-member 22 is attached through the second attachment portion 30 to the load transmission member 17 having high rigidity and strength. This makes it possible in this embodiment to further improve the mounting rigidity and mounting strength of the front cross-member 22.

Further, according to this embodiment, the load transmission member 17 is provided with the closed section portion 58 having a closed section 56 that is closed by each vehicle body side frame 12 and the rear floor panel 13. To be more specific, the load transmission member 17 having a generally L-shaped cross-section (vertical wall portion 17a and horizontal wall portion 17b), the longitudinally front middle portion 50 of each vehicle body side frame 12, and the laterally outer portion 54 of the rear floor panel 13 constitute the closed section portion 58 having the closed section 56.

According to this embodiment, providing the closed section 56 makes it possible to improve the rigidity and strength of the load transmission member 17. As a result, it is possible to improve the mounting rigidity and mounting strength of the second attachment portion 30 through which the front cross-member 22 is attached to the load transmission member 17.

Further, according to this embodiment, the partition wall member 60 extending in the vehicle width direction is disposed in the closed section portion 58 that is formed by the load transmission member 17 and other members. The second attachment portion 30 is attached to the partition wall member 60. According to this embodiment, providing the partition wall member 60 makes it possible to improve the rigidity and strength of the load transmission member 17. As a result, it is possible to further improve the mounting rigidity and mounting strength of the second attachment portion 30 through which the front cross-member 22 is attached to the load transmission member 17.

Further, according to this embodiment, the first collar member 36 vertically connecting the interior of the closed section portion 58 is provided, and the second attachment portion 30 is attached to the first collar member 36. Providing the first collar member 36 makes it possible in this embodiment to improve the rigidity and strength of the load transmission member 17. As a result, it is possible to further improve the mounting rigidity and mounting strength of the second attachment portion 30 through which the front cross-member 22 is attached to the load transmission member 17.

Further, according to this embodiment, the partition wall member 60 and the first collar member 36 are disposed in the closed section portion 58, so that the rigidity and strength of the load transmission member 17 can be improved. Therefore, according to this embodiment, it is possible to further improve the mounting rigidity and mounting strength of the second attachment portion 30 through which the front cross-member 22 is attached to the load transmission member 17.

DESCRIPTION OF REFERENCE NUMERALS 10 rear subframe (subframe)
12 vehicle body side frame
13 rear floor panel
14 vehicle body cross-member
15 bent portion
17 load transmission member
20 longitudinal member
22 front cross-member (subframe cross-member)
26 first attachment portion
28 extension portion
30 second attachment portion
36 first collar member (collar member)
56 closed section
58 closed section portion
60 partition wall member

The invention claimed is:

1. A subframe structure, comprising:
a pair of right and left vehicle body side frames disposed at side portions of a vehicle body, each vehicle body side frame extending in a longitudinal direction of a vehicle and bent toward outside in a vehicle width direction at a bent portion that is provided in a middle of the vehicle body side frame;
a vehicle body cross-member extending in the vehicle width direction between the pair of right and left vehicle body side frames and having laterally outer end portions attached to the vehicle body side frames at positions longitudinally frontward of the bent portions;
a load transmission member configured to connect a portion of each vehicle body side frame that extends longitudinally frontward from the bent portion and a portion that is located laterally centrally relative to the laterally outer end portions of the vehicle body cross-member;
a pair of right and left longitudinal members extending along the pair of right and left vehicle body side frames at positions centrally spaced apart in the vehicle width direction for a predetermined distance from the vehicle body side frames; and
a subframe cross-member extending in the vehicle width direction between the pair of right and left longitudinal members; and
a rear floor panel mounted on a bottom portion of the vehicle body,
wherein the subframe cross-member has a first attachment portion, an extension portion, and a second attachment portion, the first attachment portion being attached to each longitudinal member, the extension portion extending in the vehicle width direction from the first attachment portion, and the second attachment portion being attached to the load transmission member at a laterally outer end portion of the extension portion, and
the load transmission member is provided with a closed section portion having a closed section that is closed by the each vehicle body side frame and the rear floor panel.

2. The subframe structure according to claim 1, wherein a partition wall member extending in the vehicle width direction is disposed in the closed section portion, and
wherein the second attachment portion is attached to the partition wall member.

3. The subframe structure according to claim 1, further comprising a collar member vertically connecting an interior of the closed section portion,
wherein the second attachment portion is attached to the collar member.

4. The subframe structure according to claim 1, wherein a partition wall member extending in the vehicle width direction is disposed in the closed section portion,
wherein a collar member vertically connecting an interior of the closed section portion is attached to the partition wall member, and
wherein the second attachment portion is attached to the collar member.

* * * * *